(12) United States Patent
Isbilen et al.

(10) Patent No.: US 9,551,305 B2
(45) Date of Patent: Jan. 24, 2017

(54) ADDITIVE SAFETY AND INJECTION SYSTEM

(71) Applicant: Aygaz Anonim Sirketi, Istanbul (TR)

(72) Inventors: Emrah Isbilen, Istanbul (TR); Burak Yaman, Kocaeli (TR); Emrah Birsen, Kocaeli (TR)

(73) Assignee: Aygaz Anonim Sirketi, Istanbul (TR)

( * ) Notice: Subject to any disclaimer, the term of this patent is extended or adjusted under 35 U.S.C. 154(b) by 0 days.

(21) Appl. No.: 15/070,864

(22) Filed: Mar. 15, 2016

(65) Prior Publication Data

US 2016/0195042 A1 Jul. 7, 2016

Related U.S. Application Data

(63) Continuation of application No. PCT/TR2014/000419, filed on Nov. 12, 2014.

(30) Foreign Application Priority Data

Dec. 31, 2013 (TR) .............................. a 2013 15663

(51) Int. Cl.
*F02M 25/14* (2006.01)
*B01F 13/00* (2006.01)
(Continued)

(52) U.S. Cl.
CPC .............. *F02M 25/14* (2013.01); *B01F 5/106* (2013.01); *B01F 13/002* (2013.01); *B01F 13/04* (2013.01); *B60K 2015/03348* (2013.01)

(58) Field of Classification Search
CPC ........ F02M 25/14; B01F 13/002; B01F 13/04; B01F 5/106; B60K 2015/03348
(Continued)

(56) References Cited

U.S. PATENT DOCUMENTS 5,609,417 A 3/1997 Otte
5,992,473 A 11/1999 Hammonds
(Continued)

FOREIGN PATENT DOCUMENTS

EP 2 141 042 A1 1/2010
GB 1 520 874 A 8/1978
(Continued)

OTHER PUBLICATIONS

International Search Report, dated Apr. 21, 2015, pp. 1-11, issued in International Application No. PCT/TR2014/000419, European Patent Office, Rijswijk, The Netherlands.
(Continued)

*Primary Examiner* — Craig Schneider
*Assistant Examiner* — Josephine Trinidad-Borges
(74) *Attorney, Agent, or Firm* — Brinks Gilson & Lione

(57) ABSTRACT

A safety and injection system for adding an additive to fuel in a fuel chamber, includes a portable additive source having a body, an additive chamber, a memory, a fuel inlet, and a fuel outlet. The system can also include a fuel inlet valve which is connected to the fuel chamber, and includes a connector for connecting to the fuel inlet; a fuel outlet valve which is connected to the fuel chamber and including a connector for connecting to the fuel outlet. The system can further include a platform having a memory reader/writer that reads the information in memory and is capable of writing information on memory, and on which the portable additive source is placed; and at least one control unit which is connected with the memory reader/writer, which includes a user interface device for receiving control information from the user, and which controls the operation of the safety and injection system.

18 Claims, 3 Drawing Sheets

(51) Int. Cl.
*B01F 5/10* (2006.01)
*B01F 13/04* (2006.01)
*B60K 15/03* (2006.01)

(58) Field of Classification Search
USPC ............. 137/88, 205.5, 268, 464.5; 141/104, 141/363–366; 366/132, 182.3, 182.4, 136, 142, 366/137
See application file for complete search history.

(56) References Cited

U.S. PATENT DOCUMENTS

| | | | | |
|---|---|---|---|---|
| 7,934,680 B2* | 5/2011 | Smith | ................... | B64F 5/0063 137/79 |
| 8,074,819 B2* | 12/2011 | Dexter | ................... | F01P 11/029 137/571 |
| 8,261,780 B2* | 9/2012 | Thomas | ................... | A47L 13/50 141/104 |
| 2006/0283932 A1* | 12/2006 | Asp | ........................... | B65C 7/00 235/375 |
| 2007/0266941 A1* | 11/2007 | Marsh | ................ | C23C 16/45593 118/715 |
| 2008/0002518 A1* | 1/2008 | Fittkau | ................ | B01F 3/04496 366/152.1 |
| 2010/0236638 A1* | 9/2010 | Streib | .................... | B60K 15/04 137/14 |
| 2011/0299357 A1* | 12/2011 | Vasshus | ................ | B01F 3/0865 366/132 |
| 2012/0012191 A1* | 1/2012 | Hoshino | ............. | G03F 7/70341 137/154 |

FOREIGN PATENT DOCUMENTS

WO WO 2006/110714 A2 10/2006
WO WO 2009/154468 A1 12/2009

OTHER PUBLICATIONS

International Preliminary Report on Patentability, dated Dec. 7, 2015, pp. 1-6, issued in International Application No. PCT/TR2014/000419, European Patent Office, Rijswijk, The Netherlands.

* cited by examiner

ADDITIVE SAFETY AND INJECTION SYSTEM

CROSS-REFERENCE

The present application is a continuation application of, and claims priority under 35 U.S.C. §120 to Patent Cooperation Treaty Application No. PCT/TR2014/000419, "An Additive Safety and Injection System", filed Nov. 12, 2014, which is incorporated by reference in its entirety, and which claims priority to Turkish Patent Application No. TR 2013/15663, filed Dec. 31, 2013.

TECHNICAL FIELD

The present disclosure relates to safety and injection systems for adding an additive into fluidic fuels in a safe manner.

BACKGROUND

In road vehicles, fluidic fuels such as LPG, LNG, natural gas, gasoline and diesel may be used. In order to increase efficiency of the said fuels, various additives may be added into the fuel prior to sales. These additives are mainly produced by fuel manufactures, which have a secret formulation. In order to increase efficiency of the said additives, such additives may be added into the fuel in fuel storage facilities. However, such introduction of additives into the fuel must be performed in a safe manner due to the fact that the formulation of the additive is secret. Otherwise, the additive may be obtained by ill-intentioned persons and thus the additive may be analyzed and the formulation of the additive may be captured.

In addition, the amount of the additive to be added into the fuel is of utmost importance in order to get optimum efficiency from the additive. Because of the above-mentioned problems, in the state-of-art applications, addition of the additive into the fuel is performed by a panel of several authorities. The said panel prevents the additive from being obtained by unauthorized persons and adjusts the amount of the additive based on the amount of the fuel in which an additive is to be introduced so as to get optimum efficiency from the additive. However, the said panel results in a great economic burden for the fuel seller and also a slowdown in the addition of the additive into the fuel.

BRIEF SUMMARY

A safety and injection system for safe addition of an additive into the fuel available inside a fuel chamber comprises at least one portable additive source which has at least one body, at least one additive chamber located in the body and in which the additive to be added into the fuel inside the fuel chamber is stored, at least one memory comprising safety information, at least one fuel inlet connected to the additive chamber and at least one fuel outlet connected to the additive chamber; at least one fuel inlet valve which is, at least on one side, connected to the said fuel chamber, which comprises at least one connector for connecting, at least on the other side, to the fuel inlet and which supplies the fuel received from the fuel chamber into the additive chamber through the fuel inlet; at least one fuel outlet valve which is, at least on one side, connected to the said fuel chamber, which comprises at least one connector for connecting, at least on the other side, to the fuel outlet and which supplies the additive inside the additive chamber and the fuel from the fuel inlet into the additive chamber; at least one platform which has at least one memory reader/writer that reads the information in the said memory and is capable of writing information on the memory and on which the said portable additive source is placed; and at least one control unit which is connected with the said memory reader/writer, which comprises a user interface device for receiving at least one control information from the user, and which controls the operation of the safety and injection system based on the data received from the interface device and memory reader/writer.

With some embodiments of the safety and injection system, an additive is added into the fuel available in a fuel chamber in a safe and quick manner. Thanks to the memory in the portable additive source, even if the portable additive source is introduced into a wrong fuel chamber, the additive is not allowed to be added into the fuel. Furthermore, since the user information is inputted by means of the user interface device in the said control unit non-authorized persons are prevented from performing a process for addition of an additive.

An aspect of some embodiments is to provide a safety and injection system for adding an additive into the fuel.

Another aspect of some embodiments is to provide a safety and injection system for adding a desired amount of the additive into the fuel.

Another aspect of some embodiments is to provide a safety and injection system wherein non-authorized persons are prevented from obtaining the additive to be added into the fuel.

Still another aspect of some embodiments is to provide a safety and injection system which is easy-to-use, practical and reliable.

BRIEF DESCRIPTION OF THE DRAWINGS

Illustrative embodiments of the safety and injection system are depicted in the attached drawings, in which.

Figure 1:
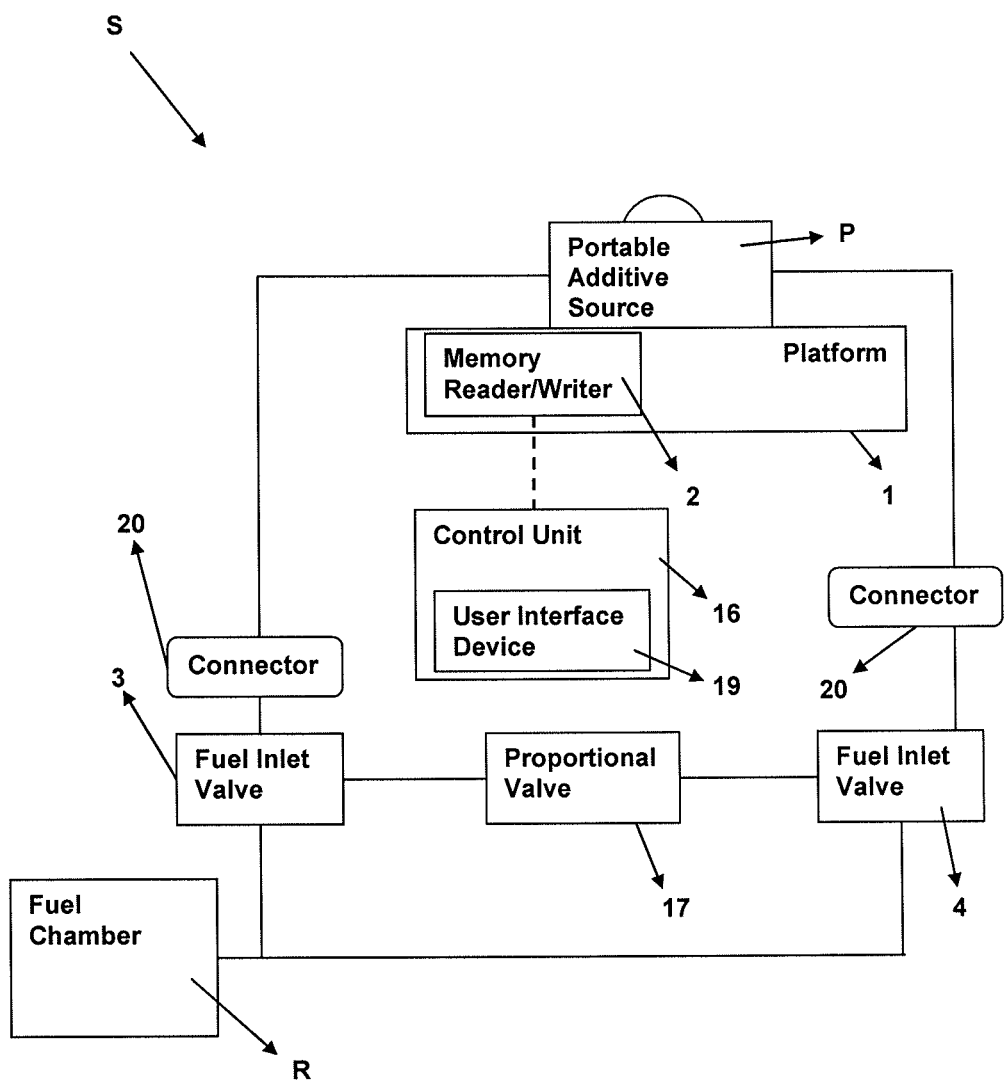
FIG. 1 is a block diagram of an embodiment of the safety and injection system.

All the parts illustrated in the drawing are individually assigned a reference numeral and the corresponding terms of these numbers are listed as follows:

Safety and injection system (S)
Fuel chamber (R)
Portable additive source (P)
Platform (1)
Memory reader/writer (2)
Fuel inlet valve (3)
Fuel outlet valve (4)
Additive chamber (5)
Memory (6)
Fuel inlet (7)
Fuel outlet (8)
Body (9)
Handle (10)
Inlet valve (11)
Outlet valve (12)
Additive inlet (13)
First sensor system (14*a*)
Second sensor system (14*b*)
Safety outlet (15)
Control Unit (16)

Proportional Valve (17)
Scavenging Source (18)
User Interface Device (19)
Connector (20)

DETAILED DESCRIPTION

Various additives may be added into the fuels in order to increase efficiency of the fuel. Addition of the additives into the fuel is performed in fuel storage facilities prior to the sale of the fuel to the users. Since the formulation of the additive is secret, addition of the additive into the fuel must be performed in a reliable manner. Therefore, there is provided a safety and injection system for safe adding an additive into the fuel.

Figure 2:
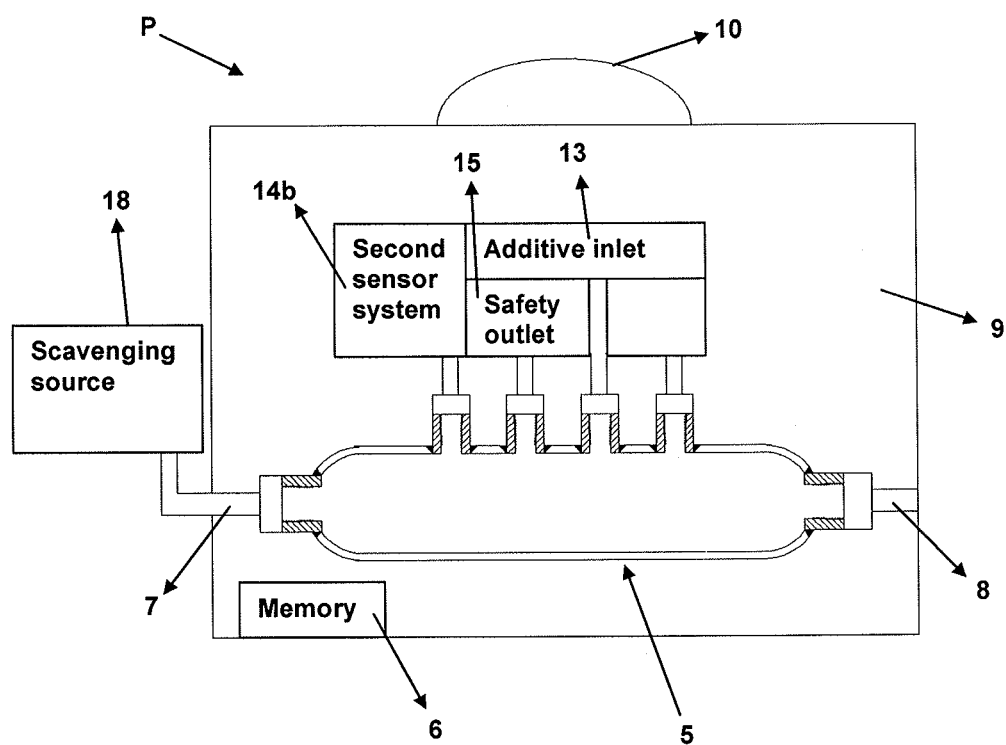
FIG. 2 is a sectional view of a portable additive source used in the safety and injection system.
Figure 3:
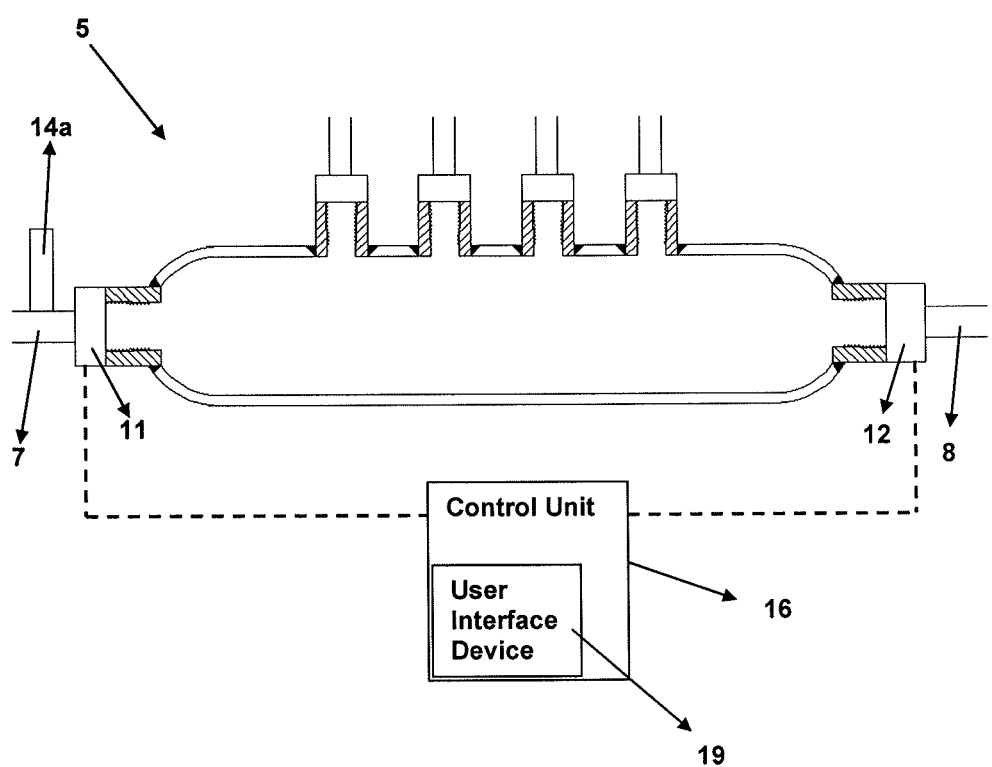
FIG. 3 is a sectional view of an additive chamber in the portable additive source.

Embodiments of the safety and injection system (S) are illustrated in FIGS. 1-3 and comprise at least one fuel chamber (R) wherein the fuel into which an additive is to be added is stored; at least one portable additive source (P) which has at least one body (9), at least one additive chamber (5) located in the body (9) and in which the additive to be added into the fuel inside the fuel chamber (R) is stored, at least one memory (6) comprising safety information, at least one fuel inlet (7) connected to the additive chamber (5) and at least one fuel outlet (8) connected to the additive chamber (5); at least one fuel inlet valve (3) which is, at least on one side, connected to the said fuel chamber (R), which comprises at least one connector (20) for connecting, at least on the other side, to the fuel inlet (7) and which supplies the fuel received from the fuel chamber (R) into the additive chamber (5) through the fuel inlet (7); at least one fuel outlet valve (4) which is, at least on one side, connected to the said fuel chamber (R), which comprises at least one connector (20) for connecting, at least on the other side, to the fuel outlet (8) and which supplies the additive in the additive chamber (5) and the fuel from the fuel inlet (7) into the fuel chamber (R); at least one platform (1) which has at least one memory reader/writer (2) that reads the information in the said memory (6) and is capable of writing information on the memory (6) and on which the said portable additive source (P) is placed; and at least one control unit (16) which is connected with the said memory reader/writer (2), which comprises a user interface device (19) for receiving at least one control information from the user, and which controls the operation of the safety and injection system (S) based on the data received from the interface device and memory reader/writer (2). The said portable additive source (P) comprises at least one handle (10) for easy carriage of a user.

In other embodiments of the safety and injection system (S), an additive to be added into a target fuel chamber (R) is filled into the portable additive source (P). The amount and features of the additive are adjusted based on the type and amount of the fuel in the fuel chamber (R). Then, the portable additive source (P) is taken to the fuel chamber (R) by a production official and the portable additive source (P) is placed on the said platform (1).

The fuel inlet valve (3) is connected to the said fuel inlet (7) whereas the fuel outlet valve (4) is connected to the fuel outlet (8). When the portable additive source (P) is placed into an appropriate position, the said memory reader/writer (2) reads the data in the memory (6). Based on the data read from the memory (6), it is controlled whether the portable additive source (P) is introduced into the right fuel chamber (R) or not. Thereafter, the production official inputs the user information through the user interface device (19) and commences the addition of the additive. If the portable additive source (P) is introduced into the right fuel chamber (R) and the user information is correct, then the additive in the portable additive source (P) is delivered to the fuel chamber (R). To this end, fuel is supplied from the fuel inlet (7) into the additive chamber (5) through the said fuel inlet valve (3). Meanwhile, a mixture of fuel and additive is received from the fuel outlet (8) through the fuel outlet valve (4) and the said mixture is delivered to the fuel chamber (R). After the entire additive is delivered to the fuel chamber (R), operation information (i.e. operation time, which user has performed the operation, the success outcome of the operation etc.) is written onto the memory (6) by means of the memory reader/writer (2). Then, the fuel injection valve (3) and the fuel outlet valve (4) are closed and the portable additive source (P) is disconnected. When the said memory (P) is read in the production facility, all information relating to the operation is recorded in a database in the production facility.

In other embodiments, the said safety and injection system (S) comprises at least one inlet valve (11) located at the fuel inlet (7) and at least one outlet valve (12) located at the fuel outlet (8). The operation of the said inlet valve (11) and the outlet valve (12) are controlled by the control unit (16). In this embodiment, after it is confirmed that the portable additive source (P) is introduced into the right fuel chamber (R), the inlet valve (11) and the outlet valve (12) are opened. Otherwise, the inlet valve (11) and the outlet valve (12) are maintained at closed position. Therefore, even if a wrong portable additive source (P) is introduced into a fuel chamber (R), addition of the additive is not performed. In this embodiment, the safety and injection system (S) may also comprise at least one electrical connection (i.e. a connection cable) for connecting the control unit (16) with the said inlet valve (11) and the outlet valve (12).

In other embodiments, the safety and injection system (S) comprises at least a first sensor system (14a) located at the said fuel inlet (7) and checking whether fuel is supplied from the fuel inlet valve (3) into the fuel inlet (7). With the said first sensor system (14a), if fuel is inputted from the inlet valve (3) into the fuel inlet (7), the said inlet valve (11) is taken to its open position.

Thus, in cases where the fuel inlet valve (3) fails or the fuel inlet valve (3) is wrongly connected to the fuel inlet (7), transfer of the additive is not performed. In another preferred embodiment, the safety and injection system (S) comprises at least a second sensor system (14b) measuring the internal pressure of the additive chamber (5). In this embodiment, the values measured by the first sensor system (14a) located at the fuel inlet (7) and by the second sensor system (14b) measuring the internal pressure of the additive chamber (5) are compared and the operation of the outlet valve (12) is thus controlled. The said sensor systems (14a, 14b) may comprise a pressure sensor in embodiments wherein fuels in gaseous phase are used, and a liquid sensor for fuels in liquid phase.

In other embodiments, the safety and injection system (S) comprises at least one proportional valve (17) for supplying fuel at a higher pressure into the additive chamber (5) through the said fuel inlet valve (3). The said proportional valve (17) forms a bypass line between the fuel inlet valve (3) and the fuel outlet valve (4), thereby allowing a higher amount of fuel to be supplied into the additive chamber (5). Thus, the additive inside the additive chamber (5) is taken in a more effective and faster manner.

In other embodiments, the safety and injection system (S) comprises at least one additive inlet (13) for adding an additive into the additive chamber (5) in the production facility. Therefore, the filling of the additive into the additive chamber (5) is performed in fast and reliable manner.

In other embodiments, the safety and injection system (S) comprises at least one safety outlet (15) located in the additive chamber (5). With the said safety valve (15), if the internal pressure of the additive chamber (5) exceeds a predetermined value, the internal pressure is reduced.

In other embodiments, the safety and injection system (S) comprises at least one scavenging source (18) connected to the said fuel inlet (7) and supplying a scavenging gas (i.e. nitrogen) to the additive chamber (5). With the said scavenging source (18), after the transfer of the additive is completed, a scavenging gas is introduced into the additive chamber (5) so as to prevent that there remains fuel inside the additive chamber (5). The scavenging source (18) is preferably in the form of a tube containing compressed gas therein.

In other embodiments of the safety and injection system (S), an additive is added into the fuel available in a fuel chamber (R) in a safe and quick manner. Thanks to the memory (6) in the portable additive source (P), even if the portable additive source (P) is introduced into a wrong fuel chamber (5), the additive is not allowed to be added into the fuel. Furthermore, since the user information is inputted by means of the user interface device (19) in the said control unit (16), non-authorized persons are prevented from performing a process for addition of an additive.

We claim:

1. A safety and injection system suitable for adding an additive into fuel available in a fuel chamber comprising;
   a portable additive source comprising a body, an additive chamber located in the body and configured to store the additive suitable to be added into the fuel inside the fuel chamber, a memory comprising safety information, a fuel inlet connected to the additive chamber and a fuel outlet connected to the additive chamber;
   a fuel inlet valve including a side which is connectable to the fuel chamber, and an other side comprising a connector to connect to the fuel inlet, wherein the fuel inlet valve is configured to supply fuel received from the fuel chamber into the additive chamber through the fuel inlet;
   a fuel outlet valve including a side which is connectable to the fuel chamber, and an other side comprising a connector to connect to the fuel outlet, wherein the fuel outlet valve is configured to supply the additive in the additive chamber and the fuel received from the fuel inlet into the fuel chamber;
   a platform having a memory reader/writer configured to read safety information in the memory and configured to write safety information on the memory of the portable additive source which is placed on the platform;
   a control unit connected with the memory reader/writer, the control unit comprising a user interface device to receive control information from a user, wherein the control unit is configured to control operation of the safety and injection system based on data received from the user interface device and the memory reader/writer; and
   a scavenging source connected to the fuel inlet and configured to supply a scavenging gas to the additive chamber.

2. The safety and injection system according to claim 1, further comprising a second inlet valve located at the fuel inlet and a second outlet valve located at the fuel outlet.

3. The safety and injection system according to claim 2, further comprising an electrical connection configured to connect the inlet valve and the outlet valve to the control unit to control operation of the inlet valve and the outlet valve.

4. The safety and injection system according to claim 1, further comprising a first sensor system located at the fuel inlet, the first sensor system being configured to check whether fuel is supplied from the fuel inlet valve into the fuel inlet.

5. The safety and injection system according to claim 4, wherein the first sensor system comprises at least one pressure sensor.

6. The safety and injection system according to claim 4 or 5, wherein the first sensor system comprises a liquid sensor.

7. The safety and injection system according to claim 1 or 4, further comprising a second sensor system configured to measure an internal pressure of the additive chamber.

8. The safety and injection system according to claim 7, wherein the second sensor system comprises a pressure sensor.

9. The safety and injection system according to claim 7, wherein the second sensor system comprises a liquid sensor.

10. The safety and injection system according to claim 1, further comprising a safety outlet which reduces an internal pressure of the additive chamber if the internal pressure of the additive chamber exceeds a predetermined value.

11. The safety and injection system according to claim 1, further comprising an additive inlet configured to add the additive into the additive chamber in a production facility.

12. The safety and injection system according to claim 1, wherein the portable additive source comprises a handle.

13. The safety and injection system according to claim 1, further comprising a proportional valve located between the fuel inlet valve and the fuel outlet valve.

14. The safety and injection system according to claim 1, wherein the scavenging source is a tube containing compressed gas therein.

15. A safety and injection system suitable for adding an additive into fuel available in a fuel chamber comprising;
    a portable additive source comprising a body, an additive chamber located in the body and configured to store the additive suitable to be added into the fuel inside the fuel chamber, a memory comprising safety information, a fuel inlet connected to the additive chamber and a fuel outlet connected to the additive chamber;
    a first fuel inlet valve including a side which is connectable to the fuel chamber, and an other side comprising a connector to connect to the fuel inlet, wherein the first fuel inlet valve is configured to supply fuel received from the fuel chamber into the additive chamber through the fuel inlet;
    a first fuel outlet valve including a side which is connectable to the fuel chamber, and an other side comprising a connector to connect to the fuel outlet, wherein the first fuel outlet valve is configured to supply the additive in the additive chamber and the fuel received from the fuel inlet into the fuel chamber;
    a platform having a memory reader/writer configured to read safety information in the memory and configured to write safety information on the memory of the portable additive source which is placed on the platform;
    a control unit connected with the memory reader/writer, the control unit comprising a user interface device to receive control information from a user, wherein the control unit is configured to control operation of the safety and injection system based on data received from the user interface device and the memory reader/writer; and a second inlet valve located at the fuel inlet and a second outlet valve located at the fuel outlet.

16. The safety and injection system according to claim 15, further comprising an electrical connection configured to connect the first inlet valve and the first outlet valve to the control unit to control operation of the first inlet valve and the first outlet valve.

17. The safety and injection system according to claim 15, further comprising a sensor system located at the fuel inlet, the first sensor system being configured to confirm that fuel is being supplied from the first fuel inlet valve into the fuel inlet.

18. The safety and injection system according to claim 17, wherein the sensor system comprises at least one pressure sensor.

* * * * *